United States Patent
Yonezawa et al.

(10) Patent No.: US 10,943,363 B2
(45) Date of Patent: Mar. 9, 2021

(54) IMAGE PROCESSING APPARATUS, AND IMAGE PROCESSING METHOD

(71) Applicant: NEC Corporation, Tokyo (JP)

(72) Inventors: Yaeko Yonezawa, Tokyo (JP); Kota Iwamoto, Tokyo (JP); Ruihan Bao, Tokyo (JP); Takaaki Yoneyama, Tokyo (JP)

(73) Assignee: NEC CORPORATION, Tokyo (JP)

( * ) Notice: Subject to any disclaimer, the term of this patent is extended or adjusted under 35 U.S.C. 154(b) by 124 days.

(21) Appl. No.: 16/318,986

(22) PCT Filed: Jun. 7, 2017

(86) PCT No.: PCT/JP2017/021122
§ 371 (c)(1),
(2) Date: Jan. 18, 2019

(87) PCT Pub. No.: WO2018/016214
PCT Pub. Date: Jan. 25, 2018

(65) Prior Publication Data
US 2019/0279394 A1    Sep. 12, 2019

(30) Foreign Application Priority Data
Jul. 21, 2016   (JP) .............................. JP2016-143095

(51) Int. Cl.
*G06K 9/00*       (2006.01)
*G06T 7/73*       (2017.01)
(Continued)

(52) U.S. Cl.
CPC .................. *G06T 7/73* (2017.01); *G06K 9/46* (2013.01); *G06Q 20/208* (2013.01); *G06T 7/00* (2013.01);
(Continued)

(58) Field of Classification Search
CPC ......... G06T 7/73; G06T 7/00; G06T 2200/24; G06K 9/46; G06K 9/34; G06K 9/3241;
(Continued)

(56) References Cited

U.S. PATENT DOCUMENTS 8,438,084 B1 *  5/2013  Tesler .................. G06Q 10/087
                                                        705/29
10,546,204 B1 *  1/2020  Kumar ................. G06K 9/3241
(Continued)

FOREIGN PATENT DOCUMENTS

JP      04-023185 A      1/1992
JP      11-250182 A      9/1999
(Continued)

OTHER PUBLICATIONS

International Search Report of PCT/JP2017/021122 dated Sep. 5, 2017.

*Primary Examiner* — Jose L Couso
(74) *Attorney, Agent, or Firm* — Sughrue Mion, PLLC

(57) ABSTRACT

The present invention provides an image processing apparatus (10) including: an image processing unit (12) that recognizes one or a plurality of objects to be recognized which are included in an image to be processed, by an image recognition process using registration data including an image and/or a feature value of each of a plurality of types of objects to be recognized; an attribute-for-area specifying unit (11) that specifies one or a plurality of areas in the image to be processed and specifies attribute information in association with the area; and a decision unit (13) that decides the one or the plurality of objects to be recognized which are included in the image to be processed, on the basis of a result of the image recognition process by the image processing unit (12) and the area and the attribute information specified by the attribute-for-area specifying unit (11).

21 Claims, 10 Drawing Sheets

(51) Int. Cl.
*G06K 9/46* (2006.01)
*G06Q 20/20* (2012.01)
*G07G 1/12* (2006.01)
*G06T 7/00* (2017.01)
*G07G 1/00* (2006.01)

(52) U.S. Cl.
CPC ............... *G07G 1/00* (2013.01); *G07G 1/12* (2013.01); *G06K 2209/01* (2013.01); *G06T 2200/24* (2013.01)

(58) Field of Classification Search
CPC ........... G06K 9/00671; G06K 9/00624; G06K 9/00771; G06K 9/00664; G06K 9/00; G06K 9/325; G06K 7/10861; G06K 7/1417; G06K 7/1413; G06K 7/10297; G06K 7/10881; G06K 2209/01; G06K 2207/10504; G06K 19/06028; G06K 19/0723; G06K 19/07749; G06K 17/0022; G06Q 20/208; G06Q 20/202; G06Q 20/203; G06Q 20/201; G06Q 20/20; G06Q 10/087; G06Q 10/00; G06Q 30/06; G06Q 30/0623; G06Q 30/02; G07G 1/00; G07G 1/12; G07G 1/145; G07G 1/0045; G07G 1/0054; G07G 1/009; B65G 1/137; G06F 3/147; G06F 9/542; G09G 2380/04; G09G 2310/04; H04W 4/029; H04W 4/35; G05D 1/0246; G05D 1/0274

See application file for complete search history.

(56) References Cited

U.S. PATENT DOCUMENTS

| | | | | |
|---|---|---|---|---|
| 2008/0077511 A1* | 3/2008 | Zimmerman | .......... | G06Q 10/00 705/28 |
| 2008/0294487 A1* | 11/2008 | Nasser | ............... | G06Q 30/0203 705/7.32 |
| 2009/0094140 A1* | 4/2009 | Kwan | ................. | G06Q 10/087 705/28 |
| 2014/0244392 A1* | 8/2014 | Chang | ................. | G06Q 10/087 705/14.58 |
| 2015/0262116 A1* | 9/2015 | Katircioglu | ........ | G06K 9/00771 705/28 |
| 2015/0262120 A1* | 9/2015 | Kulig | ................... | G06Q 10/087 705/28 |
| 2016/0171707 A1* | 6/2016 | Schwartz | ............... | G06K 9/342 382/180 |
| 2016/0379367 A1* | 12/2016 | Yasunaga | ............. | G06Q 10/087 382/103 |
| 2017/0124424 A1* | 5/2017 | Takahashi | .......... | G06K 9/00664 |
| 2017/0262724 A1* | 9/2017 | Wu | ...................... | G06T 7/0004 |
| 2018/0025310 A1* | 1/2018 | Gabbai | ................ | G06Q 10/087 705/28 |

FOREIGN PATENT DOCUMENTS

| | | |
|---|---|---|
| JP | 2001-002209 A | 1/2001 |
| JP | 2009-187482 A | 8/2009 |
| WO | 2014/087725 A1 | 6/2014 |

\* cited by examiner

FIG. 3

| PRODUCT CODE | PRODUCT NAME | ATTRIBUTE INFORMATION | SIMILAR GROUP ID | APPEARANCE DATA |
|---|---|---|---|---|
| ⋮ | ○○○ | 350 ml CAN | 0001 | ⋮ |
| ⋮ | ○○○ | 500 ml CAN | 0001 | ⋮ |
| ⋮ | ○○○ | 135 ml CAN | 0001 | ⋮ |
| ⋮ | ○○○ | SIX PACK OF 350 ml CANS | 0001 | ⋮ |
| ⋯ | ⋯ | ⋯ | ⋯ | ⋯ |

FIG. 8

| PRICE RANGE (YEN) | ATTRIBUTE INFORMATION |
|---|---|
| 180~230 | 350 ml CAN |
| 280~330 | 500 ml CAN |
| ⋮ | ⋮ |

IMAGE PROCESSING APPARATUS, AND IMAGE PROCESSING METHOD

CROSS REFERENCE TO RELATED APPLICATIONS

This application is a National Stage of International Application No. PCT/JP2017/021122 filed Jun. 7, 2017, claiming priority based on Japanese Patent Application No. 2016-143095 filed Jul. 21, 2016, the disclosure of which is incorporated herein in its entirety.

TECHNICAL FIELD

The present invention relates to an image processing apparatus, an image processing method, and a program.

BACKGROUND ART

Patent Document 1 discloses a technology of scanning in a predetermined order products displayed on shelving with a handy terminal and generating a shelving-allocation layout by using scan data.

RELATED DOCUMENT

Patent Document

[Patent Document 1] Japanese Patent Application Publication No. 2001-2209

SUMMARY OF THE INVENTION

Technical Problem

In a case of the technology described in Patent Document 1, it is necessary to perform a scanning operation for each of the products one by one. Therefore, a burden of time and labor required for work is large.

In order to solve the above problem, the present inventors have examined a use of an image recognition technology. However, among a plurality of products, a similar product group (drink A of 350 ml can and drink A of 500 ml can, confectionery B of 90 g and confectionery B of 210 g, and the like) having identical or similar appearance designs and different sizes of products is included. It is difficult to accurately recognize such similar product group by the image recognition technology. Note that, the same problem may occur even in a case where an object to be recognized is not the product.

An object of the present invention is to improve accuracy of a process of recognizing an object to be recognized by using an image recognition technology.

Solution to Problem

According to the present invention, there is provided an image processing apparatus including: an image processing unit that recognizes one or a plurality of objects to be recognized which are included in an image to be processed, by an image recognition process using registration data including an image and/or a feature value of each of a plurality of types of objects to be recognized; an attribute-for-area specifying unit that specifies one or a plurality of areas in the image to be processed and specifies attribute information in association with the area; and a decision unit that decides a recognition result of the one or the plurality of objects to be recognized which are included in the image to be processed, on the basis of a result of the image recognition process by the image processing unit and the area and the attribute information specified by the attribute-for-area specifying unit.

In addition, according to the present invention, there is provided an image processing method executed by a computer, the method comprising: an image processing step of recognizing one or a plurality of objects to be recognized which are included in an image to be processed, by an image recognition process using registration data including an image and/or a feature value of each of a plurality of types of objects to be recognized; an attribute-for-area specifying step of specifying one or a plurality of areas in the image to be processed and specifying attribute information in association with the area; and a decision step of deciding the one or the plurality of objects to be recognized which are included in the image to be processed, on the basis of a result of the image recognition process by the image processing step and the area and the attribute information specified in the attribute-for-area specifying step.

In addition, according to the present invention, there is provided a program causing a computer to function as: an image processing unit that recognizes one or a plurality of objects to be recognized which are included in an image to be processed, by an image recognition process using registration data including an image and/or a feature value of each of a plurality of types of objects to be recognized; an attribute-for-area specifying unit that specifies one or a plurality of areas in the image to be processed and specifies attribute information in association with the area; and a decision unit that decides the one or the plurality of objects to be recognized which are included in the image to be processed, on the basis of a result of the image recognition process by the image processing unit and the area and the attribute information specified by the attribute-for-area specifying unit.

Advantageous Effects of Invention

According to the present invention, it is possible to improve accuracy of a process of recognizing an object to be recognized by using an image recognition technology.

BRIEF DESCRIPTION OF THE DRAWINGS

The above objects and other objects, features and advantages will become more apparent from the following description of the preferred example embodiments and the accompanying drawings.

FIG. 3 is a diagram schematically illustrating an example of data used by the image processing apparatus according to the present example embodiment.

FIG. 8 is a diagram schematically illustrating another example of the data used by the image processing apparatus according to the present example embodiment.

DESCRIPTION OF EMBODIMENTS

First, an example of a hardware configuration of an apparatus (image processing apparatus) of the present example embodiment will be described. Each of units included in the apparatus of the present example embodiment can be configured with any combination of hardware and software on the basis of a central processing unit (CPU) of any computer, a memory, a program loaded in the memory, a storage unit (can store, in addition to the program stored in advance from a stage of shipping the apparatus, a program downloaded from a storage medium such as a compact disc (CD) or a server on the internet as well) such as a hard disc storing the program, and a network connection interface. Those skilled in the art understand that there are various modifications to a configuration method and the apparatus.

Figure 1:
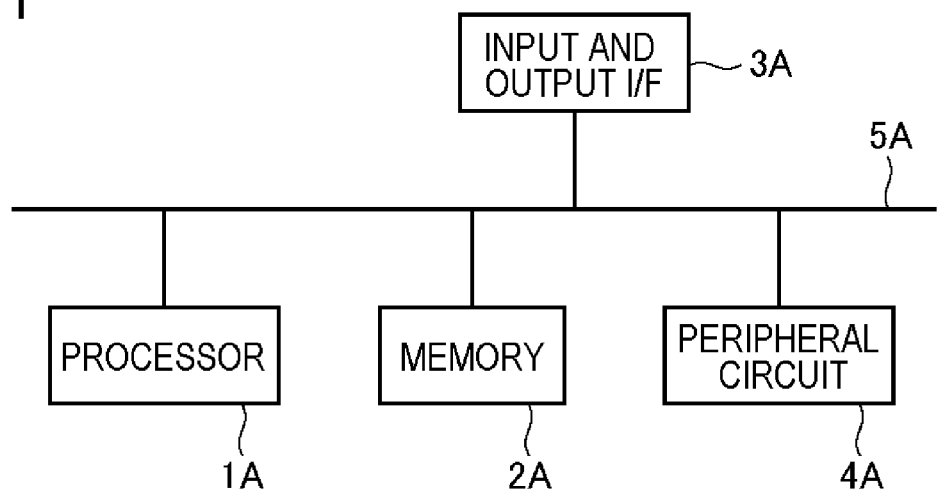
FIG. 1 is a diagram conceptually illustrating an example of a hardware configuration of an apparatus according to the present example embodiment.

FIG. 1 is a block diagram illustrating a hardware configuration of the apparatus of the present example embodiment. As illustrated in FIG. 1, the apparatus includes a processor 1A, a memory 2A, an input and output interface 3A, a peripheral circuit 4A, and a bus 5A. The peripheral circuit 4A includes various modules. Note that, the apparatus may not include the peripheral circuit 4A.

The bus 5A is a data transmission path through which the processor 1A, the memory 2A, the peripheral circuit 4A and, the input and output interface 3A transmit and receive data from one another. The processor 1A is an arithmetic processing apparatus such as a central processing unit (CPU) or a graphics processing unit (GPU). The memory 2A is a memory such as a random access memory (RAM) or a read only memory (ROM), for example. The input and output interface 3A includes an interface for obtaining information from an input device (for example, keyboard, mouse, microphone, or the like), an external apparatus, an external server, an external sensor, and the like and an interface for outputting the information from an output device (for example, display, speaker, printer, mailer, or the like), the external apparatus, the external server, and the like. The processor 1A can issue a command to each of the modules and perform a calculation on the basis of a calculation result thereof.

Hereinafter, the present example embodiment will be described. Note that, the functional block diagram used in the description of the example embodiment below is not a hardware unit configuration but a block of a functional unit. In these drawings, it is described that each apparatus is configured with one apparatus, but a configuration means of the apparatus is not limited to thereto. That is, the apparatus may have a physically separated configuration or a logically divided configuration. Note that, the same components are denoted by the same reference numerals, and description thereof is not repeated as appropriate.

First Example Embodiment

First, an overview of the present example embodiment will be described. The image processing apparatus according to the present example embodiment performs an image recognition process by using registration data including an appearance image or a feature value of an appearance for each of a plurality of types of objects to be recognized and recognizes one or a plurality of objects to be recognized which are included in an image (hereinafter, "processed image") to be processed.

In addition, the image processing apparatus specifies one or a plurality of areas in the processed image and specifies attribute information in association with the area. For example, a user specifies an area on an image in which 350 ml cans are arranged and performs input for specifying 350 ml can (attribute information) in association with the area. According to input contents of the user, the image processing apparatus specifies one or a plurality of areas on the processed image and specifies the attribute information in association with each of the areas.

Next, the image processing apparatus decides a recognition result of one or the plurality of objects to be recognized which are included in the processed image on the basis of a result of the image recognition process, and the area and the attribute information which are specified. The image processing apparatus according to the present example embodiment does not set the result of the image recognition process as it is as the recognition result but sets a calibrated result of the result of the image recognition process by the area and the attribute information as the recognition result as necessary. Accordingly, it is possible to improve accuracy of the image recognition process.

Figure 2:
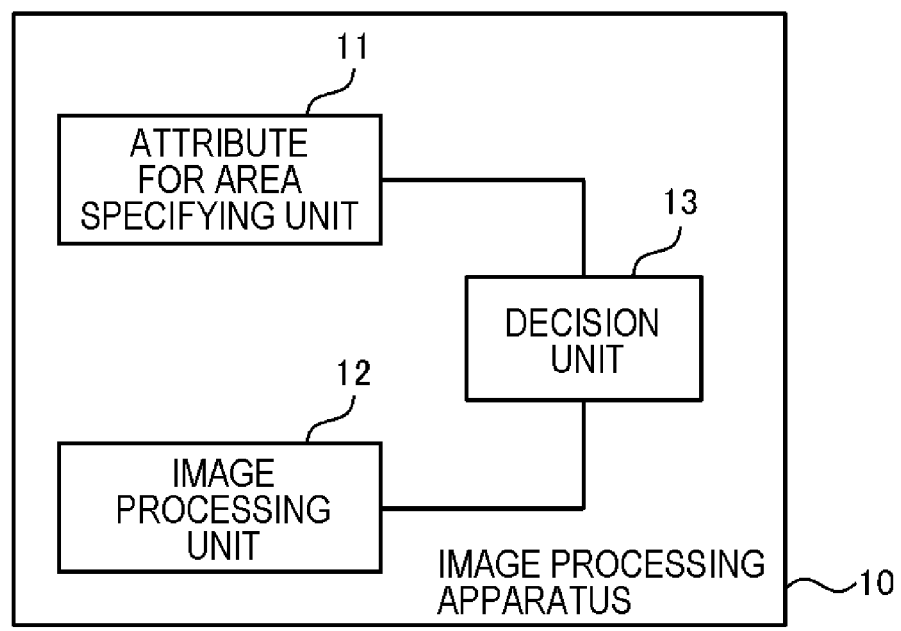
FIG. 2 is an example of a functional block diagram of an image processing apparatus according to the present example embodiment.

Next, a configuration of the image processing apparatus according to the present example embodiment will be described in detail. FIG. 2 illustrates an example of a functional block diagram of an image processing apparatus 10 according to the present example embodiment. As illustrated, the image processing apparatus 10 includes an attribute-for-area specifying unit 11, an image processing unit 12, and a decision unit 13.

The image processing unit 12 recognizes one or the plurality of objects to be recognized which are included in the processed image by the image recognition process using the registration data including the image (for example, appearance image) and/or the feature value (for example, feature value of appearance) for each of the plurality of types of objects to be recognized. The processed image is, for example, an image obtained by capturing shelving on which a product is displayed.

The object to be recognized is, for example, a product displayed and sold at a store. An example of the object to be recognized includes beverages, food, daily necessities, home appliances, miscellaneous goods, and the like, but is not limited thereto. In addition, the object to be recognized may be an industrial product (for example, raw material or the like) used in a factory or the like, or an inventory item stocked in a company or the like.

Each type of object to be recognized has a unique appearance feature. The object to be recognized includes a similar recognition object group of the objects to be recognized having identical or similar appearance designs and different sizes. For example, products with different volumes (for example, drink A of 135 ml can, drink A of 350 ml can, drink A of 500 ml can, six drinks A of 350 ml cans, and six drinks A of 500 ml cans) or the like are the similar recognition object group. Note that, the number of the objects to be recognized belonging to the similar recognition object group is various and the number of the objects to be recognized is not limited to those exemplified here.

Next, the registration data will be described. The registration data is data in which information (for example, product code, product name, and the like) for identifying each of the plurality of types of objects to be recognized is associated with the appearance image and/or the feature value of the appearance for each of the plurality of types of objects to be recognized. The plurality of objects to be recognized belonging to a certain similar recognition object group are each a different type of object to be recognized.

Note that, in the registration data, a plurality of appearance images and/or feature values of the appearance may be registered in association with one object to be recognized. For example, the appearance images and/or the feature values of the appearance when the object to be recognized is observed from each of a plurality of directions (for example, front side, top side, right side, left side, back side, bottom side, and the like) may be registered.

In addition, in the registration data, in association with some or all of the objects to be recognized, the attribute information of each of the objects to be recognized may be registered. The attribute information includes the information (for example, information for identifying a size) for identifying the plurality of objects to be recognized belonging to the same similar recognition object group.

FIG. 3 schematically illustrates an example of the registration data. The illustrated registration data is data in a case where the object to be recognized is a product displayed and sold in the store. In the illustrated registration data, a product code, a product name, an attribute information, a similar group ID (identifier), and appearance data are associated with one another.

The similar group ID is information for identifying each of a plurality of similar recognition object groups. The same similar group ID is attached to a plurality of products belonging to the same similar recognition object group. The appearance data may include information such as the feature value of the appearance, a file name, a storage location, and the like of the appearance image of each of the products.

Next, the image recognition process will be described. The image processing unit 12 recognizes one or the plurality of objects to be recognized which are included in the processed image by the image recognition process using the registration data. That is, the image processing unit 12 extracts the object to be recognized which are included in the processed image and determines the product code, the product name, or the like of the object to be recognized.

An algorithm of the image recognition process depends on a design and is not particularly limited. One example will be described below, but the example is not limited thereto.

For example, a processed area of a predetermined size and shape on the processed image may be decided, it may be determined whether or not the object to be recognized exists in the processed area by arithmetic processing using an image in the processed area (processed area image) and the appearance image and/or the feature value of the appearance (registration data) of each of the plurality of types of objects to be recognized, and in a case where the object to be recognized exists, details (product code or product name) may be determined. For example, in a case where similarity between the processed area image and the registration data of one object to be recognized is equal to or larger than a predetermined value, it may be determined that the object to be recognized exists in the processed area. Then, one or the plurality of objects to be recognized which are included in the processed image may be recognized by repeatedly performing the above process while changing a position and a size of the processed area on the processed image.

In addition, after extracting a contour in the processed image by a contour extraction process, the contour which coincides with a contour shape of the object to be recognized registered in advance or which has a similarity of equal to or higher than a predetermined level to the contour shape of the object to be recognized may be determined as the processed area. By the arithmetic processing using the image in the processed area and the appearance image and/or the feature value of the appearance (registration data) of each of the plurality of types of objects to be recognized, it may be determined whether or not the object to be recognized exists in the processed area and in the case where the object to be recognized exists, details (product code or product name) may be determined. Then, one or the plurality of objects to be recognized which are included in the processed image may be recognized by performing the above process on all of the determined processed areas.

The image processing unit 12 outputs one or a plurality of pairs in which at least the information (for example, product code, product name, and the like) for identifying each of the recognized objects to be recognized and the position (for example, position of the processed area) in each of the processed images are associated with each other, as the result of the image recognition process. The information indicating the position in the processed image may be information indicating a position, a size, a shape, and the like of the processed area using coordinates, for example.

Note that, in a case where the plurality of objects to be recognized are recognized for the one processed area (for example, a case where there are two or more objects of which similarity is equal to or higher than a predetermined level), the result of the image recognition process in which the position (for example, position of the processed area) in the processed image is associated with the plurality of recognized objects to be recognized may be output. That is, a relationship between the information (for example, product code, product name, and the like) for identifying the recognized object to be recognized and the position (for example, position of the processed area) in the processed image in the pair may be many-to-one.

In addition, in a case where the plurality of objects to be recognized are recognized for the one processed area (for example, a case where there are two or more objects of which similarity is equal to or higher than a predetermined level), the result of the image recognition process in which the position (for example, position of the processed area) in the processed image is associated with the information (for example, product code, product name, and the like) for identifying the object to be recognized having the highest similarity may be output.

Further, in a case where an image obtained by imaging a product displayed on shelving is input as the processed image, the image processing unit 12 may further specify the following contents and output the contents as the result of the image recognition process.

For example, the image processing unit 12 may determine a display position on the shelving for each of the recognized objects to be recognized and output the display position as the result of the image recognition process. The display position on the shelving may include a shelf number (for example, tier number obtained by counting tiers captured in the processed image from a bottom) and a position on the shelf (for example, position number obtained by counting products on each tier captured in the processed image from a left.).

In addition, the image processing unit 12 may determine a face side (side captured in the processed image, front side, top side, right side, left side, back side, bottom side, and the like) for each of the objects to be recognized and output the face side as the result of the image recognition process. Further, the image processing unit 12 may determine a face rotation (the rotation state of the object captured in the processed image indicating the front side thereof is rotated to what direction and by what degree. 0 degrees, left 90 degrees, 180 degrees, right 90 degrees, and the like.) of each of the objects to be recognized and output the face rotation as the result of the image recognition process. Those can be determined by performing the image recognition process using the appearance images and/or the feature values of the appearance (registration data) when the object to be recognized is observed from each of a plurality of directions (for example, front side, top side, right side, left side, back side, bottom side, and the like).

Returning to FIG. 2, the attribute-for-area specifying unit 11 specifies one or the plurality of areas in the processed image and specifies the attribute information in association with each of the specified areas. The attribute information to be specified includes the information (see the attribute information in FIG. 3) for identifying the plurality of objects to be recognized belonging to the same similar recognition object group.

The attribute-for-area specifying unit 11 according to the present example embodiment includes a unit which displays the processed image and a unit which receives input information for specifying the area and the attribute information from the user on the displayed processed image and specifies the area and the attribute information on the basis of the input information. That is, the attribute-for-area specifying unit 11 according to the present example embodiment specifies the area and the attribute information on the basis of a user input.

The processed image is displayed through various output devices such as a display, a projector, and the like. The user specification of the area and the attribute information is received through various input devices such as a keyboard, a mouse, a touch panel display, an operation button, a camera, a microphone, and the like.

Figure 4:
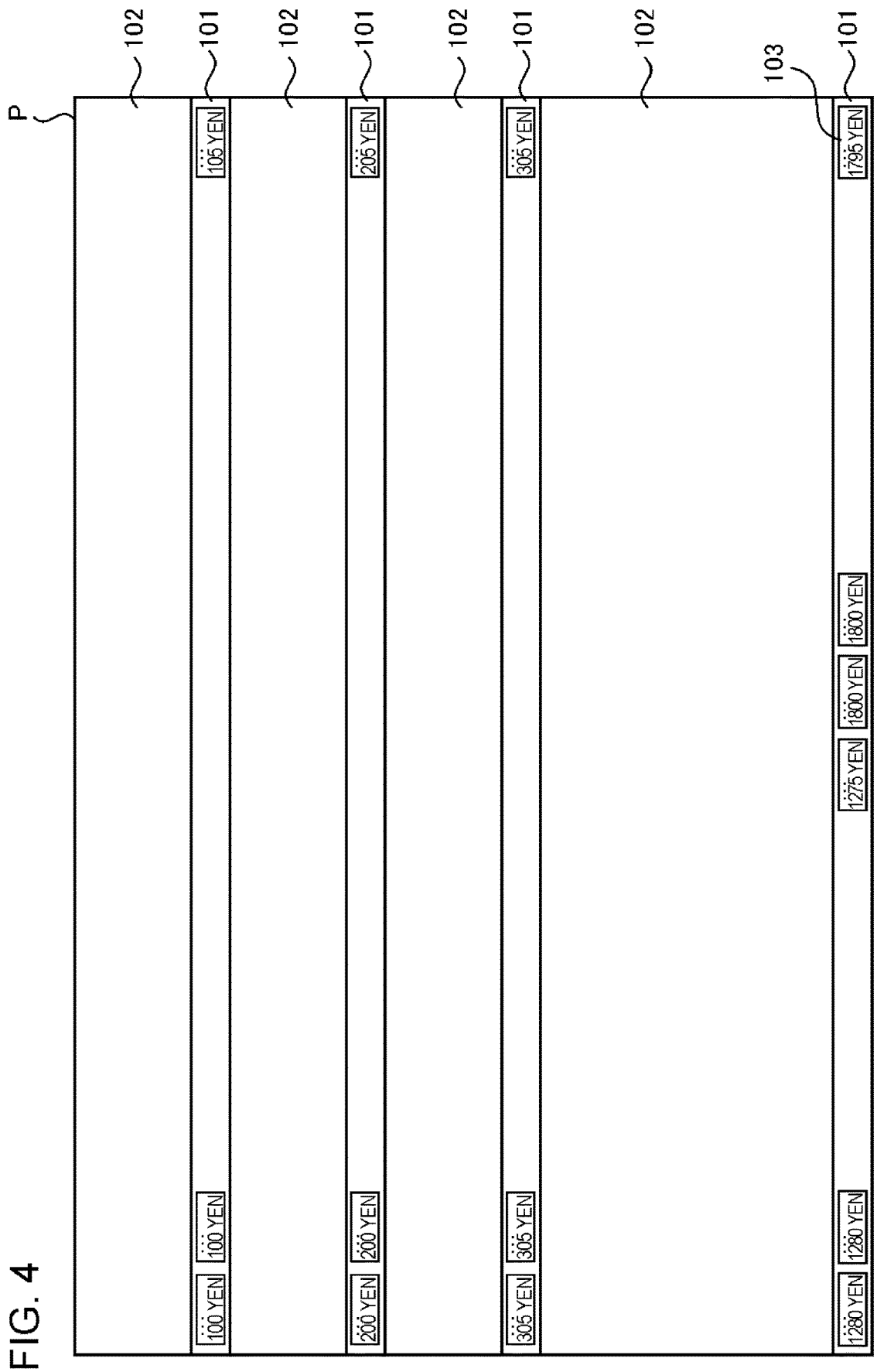
FIG. 4 is a diagram schematically illustrating an example of a processed image of the present example embodiment.

FIG. 4 schematically illustrates an example of a processed image P displayed by the attribute-for-area specifying unit 11. The drawing is an image obtained by capturing a product displayed on shelving, but the display of the product is omitted. The shelving is divided into a plurality of tiers (four tiers in the drawing) by a plurality of shelf boards. There is a space (product display unit 102) for displaying products corresponding to each tier. There is a price tag installation unit 101 in which a price tag 103 is installed on a front of the shelf board and a bottom board. Each of the price tags 103 is installed corresponding to the display position of the corresponding product. In the drawing, the price tag 103 is installed so as to be located below (preferably directly below) the corresponding product in a plan view of the shelving viewed from the front.

Figure 5:
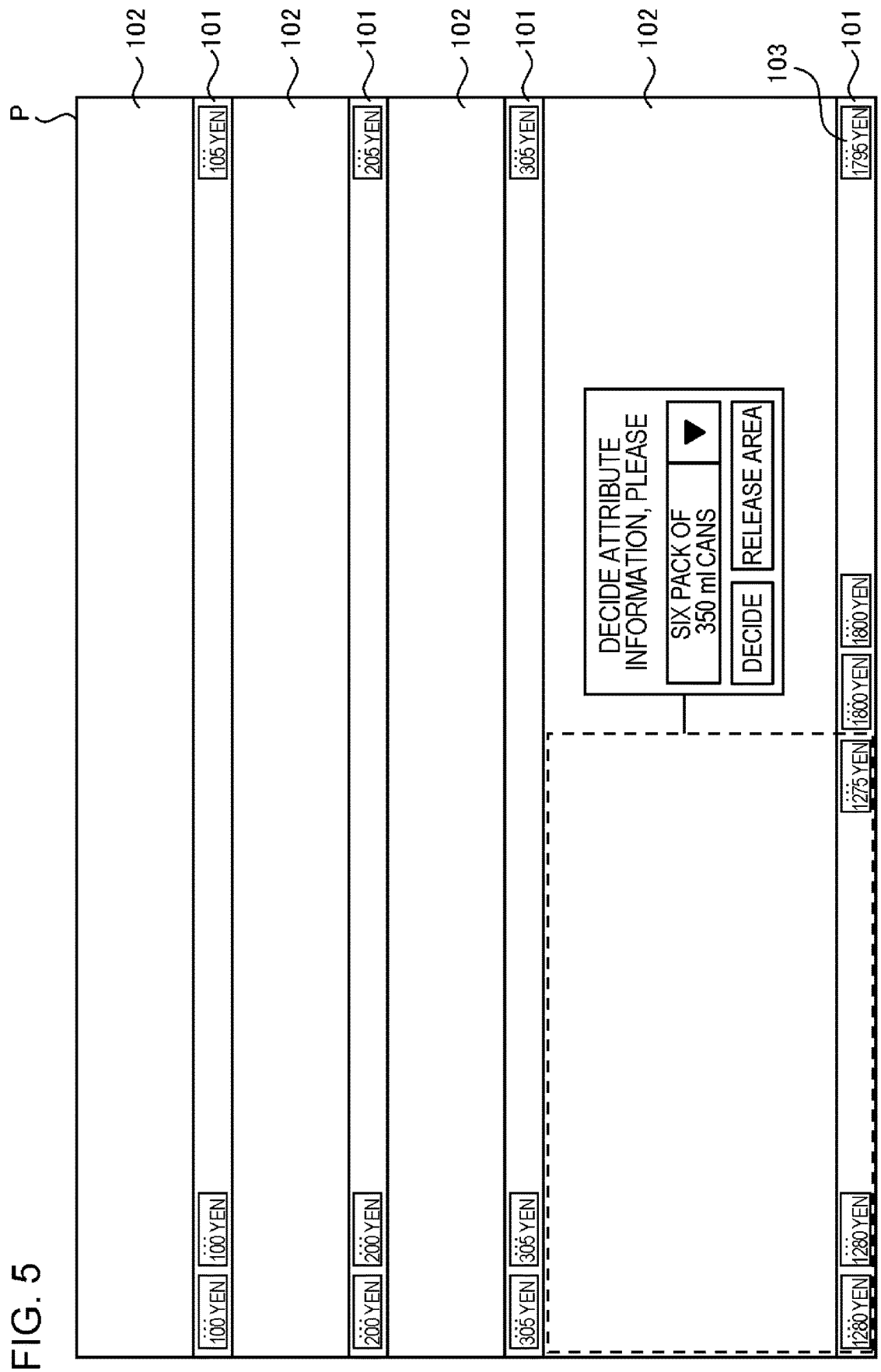
FIG. 5 is a diagram for explaining an example of a process of specifying an area and attribute information in the processed image of the present example embodiment.

Next, an example of a process of receiving specification of the area and the attribute information on the processed image P from the user will be described with reference to FIG. 5.

For example, the user operates a predetermined input device and specifies a predetermined area in the processed image P. Then, as illustrated, the attribute-for-area specifying unit 11 superimposes and displays a frame 300 indicating the specified area on the processed image P. Then, the attribute-for-area specifying unit 11 receives an input of specifying the attribute information corresponding to the specified area. In the illustrated example, a window for receiving the input of the attribute information is displayed in association with the frame 300. In the window, a graphical user interface (GUI) part (drop-down list) for selecting the attribute information and GUI parts (selection buttons) for deciding the attribute information and releasing the specified area are displayed. Note that, other GUI parts may be used.

The attribute-for-area specifying unit 11 may receive specification of one or the plurality of areas so as to fill the entire processed image P. In addition the attribute-for-area specifying unit 11 may receive specification of one or the plurality of areas so as to fill only a part of the processed image P. That is, there may be a portion not specified as an area in the processed image P.

Returning to FIG. 2, the decision unit 13 decides the recognition result of one or the plurality of objects to be recognized which are included in the processed image on the basis of the result of the image recognition process by the image processing unit 12 and the area and the attribute information specified by the attribute-for-area specifying unit 11.

Here, an example of a decision process by the decision unit 13 will be described. For example, the decision unit 13 may determine whether or not the result of the image recognition process on a first object to be recognized located at a first area specified by the attribute-for-area specifying unit 11 is inconsistent with the attribute information specified corresponding to the first area. In a case where the result is inconsistent with the attribute information, the decision unit 13 may decide, from among the similar recognition object group to which the object to be recognized indicated by the result of the image recognition process belongs, an object to be recognized of which the attribute information coincides with the specified attribute information, as the recognition result of the first object to be recognized. On the other hand, in a case where the result is consistent with the attribute information, the decision unit 13 may set the result of the image recognition process on the first object to be recognized as the recognition result of the first object to be recognized.

Here, an example of the process will be described. First, the decision unit 13 extracts a pair of which the position in the processed image is included (for example, all are included, a part is included, or included by a predetermined percentage or more) in the first area, from one or the plurality of pairs (a pair in which at least the information (for example, product code, product name, and the like) for identifying the recognized object to be recognized and the position (for example, position of the processed area) in the processed image are associated with each other) included in the result of the image recognition process.

After then, the decision unit 13 determines the attribute information of the object to be recognized for each of the pairs by using the registration data (see FIG. 3) and the identification information (product code, product name, and the like) of the object to be recognized included in the extracted pair. Next, the decision unit 13 determines whether or not the determined attribute information is equal to the attribute information specified corresponding to the first area. In a case where the determined attribute information is not equal to the attribute information, the decision unit 13 determines that the result of the image recognition process of the pair is inconsistent. On the other hand, in a case where the determined attribute information is equal to the attribute information, the decision unit 13 determines that the result of the image recognition process of the pair is consistent.

In a case where it is determined that the result of the image recognition process of the pair is inconsistent, the decision unit 13 determines objects to be recognized (objects to be recognized associated with the same similar group ID) belonging to the same similar recognition object group as the object to be recognized which is recognized in the image recognition process by using the registration data (see FIG. 3) and the identification information of the object to be recognized included in the pair. Then, the decision unit 13 determines, from among the determined objects to be recognized, an object to be recognized of which the attribute information is equal to the attribute information specified corresponding to the first area. The decision unit 13 changes the identification information of the object to be recognized included in the pair in process to the identification information of the newly determined object to be recognized.

For example, in a case where the result (the object to be recognized having the highest similarity) of the image recognition process on the object to be recognized located at the first area in which the attribute information of "350 ml can" is specified is "product A: 500 ml can", the decision unit 13 determines that the result of the image recognition process is inconsistent with the attribute information. The decision unit 13 decides "product A: 350 ml can" as the recognition result for the object to be recognized.

Next, another example of the decision process by the decision unit 13 will be described. For example, in a case where the result of the image recognition process on the first object to be recognized located at the first area includes the plurality of objects to be recognized belonging to the same similar recognition object group, the decision unit 13 may decide the object to be recognized of which the attribute information coincides with the attribute information specified corresponding to the first area from among the plurality of objects to be recognized, as the recognition result of the first object to be recognized.

Here, an example of the process will be described. First, the decision unit 13 extracts pairs in which a relationship between the information (for example, product code, product name, and the like) for identifying the recognized object to be recognized and the position (for example, position of the processed area) in the processed image is many-to-one from among the pairs (a pair in which at least the information (for example, product code, product name, and the like) for identifying the recognized object to be recognized is associated with the position (for example, position of the processed area) in the processed image). Then, the decision unit 13 extracts the object to be recognized of which the attribute information coincides with the attribute information specified corresponding to the first area from among a plurality of pieces of the information for identifying the objects to be recognized included in each of the extracted pairs by referring to the registration data (see FIG. 3). The decision unit 13 decides the information for identifying the extracted object to be recognized as the recognition result of the position in the processed image included in the pair in process.

For example, in a case where the result of the image recognition process on the object to be recognized located at the first area in which the attribute information of "350 ml can" is specified is "product A: 500 ml can", "product A: 350 ml can", and "product A: 135 ml can", the decision unit 13 decides "product A: 350 ml can" as the result of the image recognition process on the object to be recognized. Note that, in a case (for example, product A of 350 ml can and product B of 350 ml can) where there are the plurality of objects to be recognized of which the attribute information coincides with the attribute information specified corresponding to the first area among the result of the image recognition process on the object to be recognized located at the first area, the decision unit 13 may decide the object to be recognized having the highest similarity as the recognition result.

The decision unit 13 outputs, for example, the recognition result decided as described above. Note that, for the object to be recognized located at the portion not specified by the attribute-for-area specifying unit 11, the decision unit 13 can output the result of the image recognition process as it is as the recognition result.

The image processing apparatus 10 may output the recognition result output from the decision unit 13 through an output device such as a projector or the like. For example, the image processing apparatus 10 may output the recognition result, being superimposed on the processed image, decided by the decision unit 13.

Figure 6:
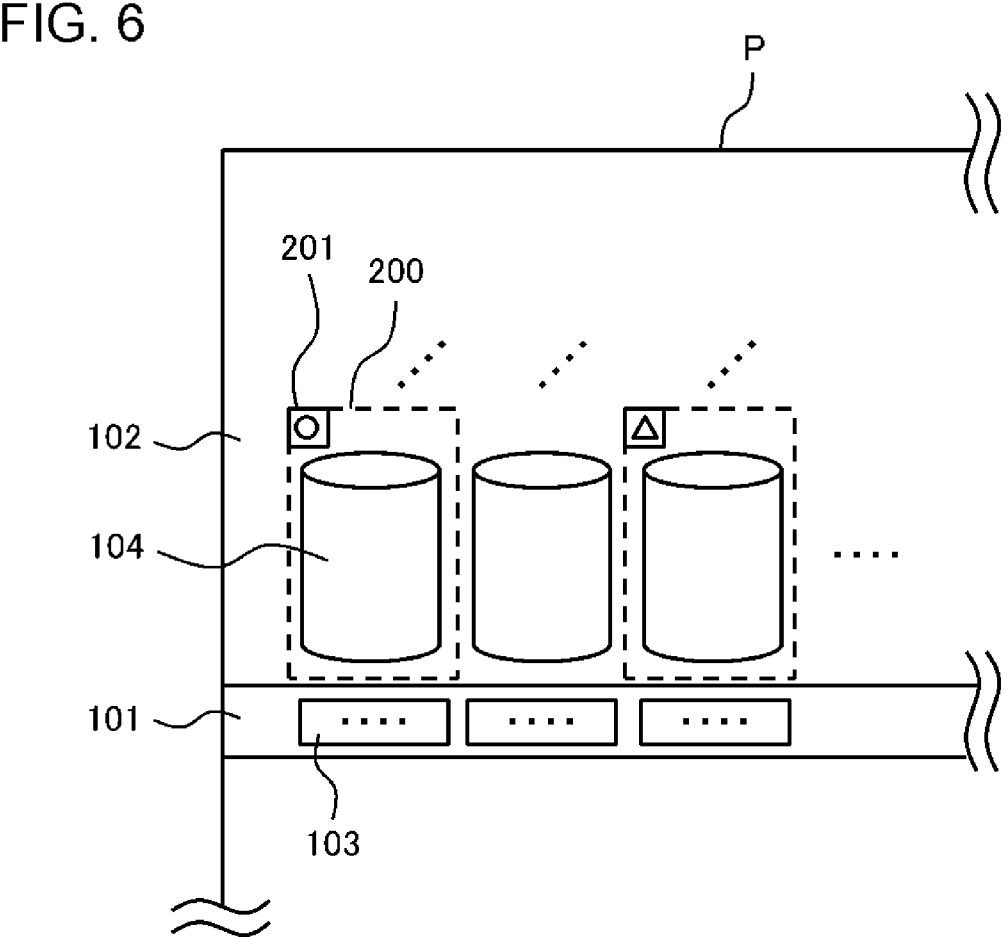
FIG. 6 is a diagram schematically illustrating an example of a picture output by the image processing apparatus according to the present example embodiment.

FIG. 6 schematically illustrates an example of an output image. In the drawing, only a part of the processed image is enlarged and displayed. In the drawing, a frame 200 is displayed in the processed image in association with the position where the object to be recognized (product 104) is recognized and attached information 201 for identifying contents of the recognition result in association with each of frames 200 is attached. The attached information 201 may be configured with letters, numbers, symbols, pictures, and the like, for example. The attached information 201 may indicate, for example, similarity calculated in the image recognition process. In addition, the attached information 201 may indicate whether or not the recognition result decided by the decision unit 13 is changed from the result of the image recognition process. Note that, the attached information 201 may indicate the above-described contents depending on a difference in the configuration of the frame 200 (for example, a difference in color, a difference in shape, a difference in size, a difference in lines, or the like).

Note that, when receiving an operation of specifying one frame 200 on the screen by mouse over or the like, the image processing apparatus 10 may display the recognition result corresponding to the frame. That is, information such as "product A: 350 ml can" or the like may be displayed.

In addition, the image processing apparatus 10 may receive an input of modifying the result of the recognition process on the screen. For example, after receiving the operation of specifying one frame 200, the image processing apparatus 10 may receive an input of changing the result of the recognition process corresponding to the frame 200. The image processing apparatus 10 may change the recognition result decided by the decision unit 13 according to the input.

In addition, the image processing apparatus 10 may receive an input of registering new data as the registration data, on the screen. For example, on the screen, the user may specify a part of the area of the processed image and may perform input of registering an image displayed on the area in association with a predetermined object to be recognized as the registration data.

For example, after receiving specification of the area, the image processing apparatus 10 may receive whether "selection from the registered objects to be recognized" or "specify new" for the associated object to be recognized.

In a case of selecting "selection from the registered objects to be recognized", for example, the image processing apparatus 10 may receive selection from the identification information (for example, product code and product name) of objects to be recognized registered in the registration data by using GUI parts such as a dropdown list and the like. As a use case of the process, for example, a case where an image obtained by capturing an already registered object to be recognized from a new direction is registered as registration data or the like is considered.

On the other hand, in a case of receiving "specify new", for example, the image processing apparatus 10 may receive an input of the identification information of a new object to be recognized by using GUI parts such as an input dialog box and the like. As a use case of the process, a case where an image of the new object to be recognized, not registered in the registration data, such as a new product is newly registered or the like is considered.

Figure 7:
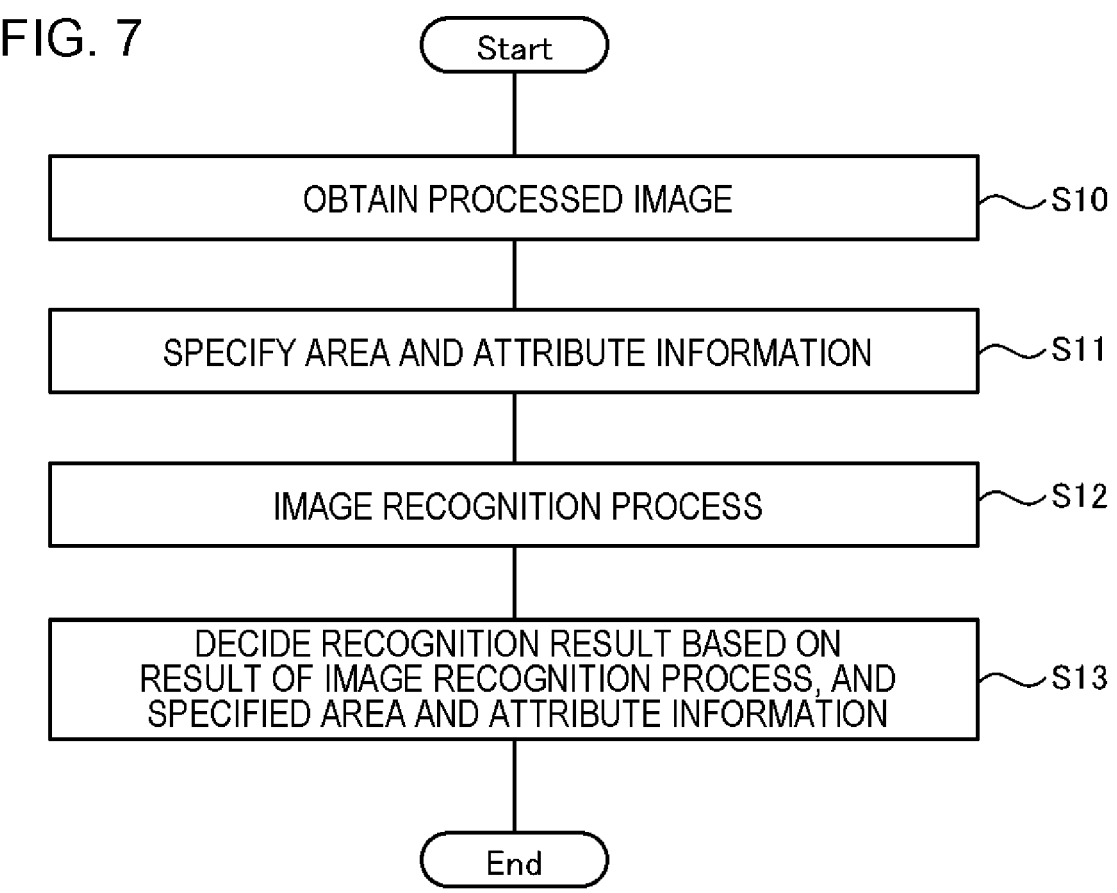
FIG. 7 is a flowchart illustrating an example of a flow of a process of the image processing apparatus according to the present example embodiment.

Next, an example of a flow of the process of the image processing apparatus 10 according to the present example embodiment will be described with reference to a flowchart in FIG. 7.

First, the image processing apparatus 10 obtains the processed image (S10).

After S10, the attribute-for-area specifying unit 11 specifies one or the plurality of areas in the processed image and specifies the attribute information in association with the area (S11). In the present example embodiment, the attribute-for-area specifying unit 11 displays the processed image and receives specification of the area and the attribute information on the displayed processed image from the user.

In addition, after S10, the image processing unit 12 recognizes one or the plurality of objects to be recognized which are included in the processed image by the image recognition process using the registration data including the appearance image and/or the feature value of the appearance of each of the plurality of types of objects to be recognized (S12). Note that, orders of S11 and S12 are not limited to the orders illustrated in FIG. 7.

After then, the decision unit 13 decides the recognition result on the basis of the contents specified in S11 and the image recognition process in S12.

Next, an advantageous effect of the present example embodiment will be described. In the present example embodiment, the result of the image recognition process as it is may not be set as the recognition result but contents calibrated by using the area and the attribute information specified on the processed image can be set as the recognition result. For example, a value for identifying the similar recognition object group in association with each of the areas is specified and the result of the image recognition process is calibrated on the basis of the value. Therefore, it is possible to improve the problem that the similar recognition object group cannot be recognized with high accuracy, by using the image recognition process.

By the way, in an example of the present example embodiment, the object to be recognized is a product displayed on the shelving, but in this case, products with the same attribute information are often displayed together. That is, in the processed image, the products with the same attribute information are often imaged together. In the present example embodiment, the area and the attribute information are specified on the basis of the user input, but in consideration of the circumstances described above, the user can specify the area on which the products of the same attribute information are imaged at one time and can specify the attribute information. That is, the number of areas specified on the processed image is small. Therefore, it is possible to reduce inconvenience that a burden on the user increases.

In addition, in the present example embodiment, it is possible to display the recognition result on the screen (see FIG. 6) and to register new registration data (master image or the like) from the screen. For example, the user can recognize the object to be recognized not recognized (without the frame 200) and can newly register the registration data of the object to be recognized, through the screen. In addition, the user can recognize the object to be recognized having low similarity in the image recognition process (for example, recognized on the basis of the attached information 201) and can newly register an image of the object to be recognized, through the screen. In this way, according to the present example embodiment, it is possible to register the new registration data by using the processed image. Therefore, the repetition of the process allows the registration data to be enriched. Accordingly, it is possible to improve accuracy of the image recognition process.

In addition, in the present example embodiment, in a case where the object to be recognized is the product displayed on the shelving, it is possible to determine the display position of each of the recognized objects to be recognized. According to the present example embodiment, by using a handy terminal, without a troublesome work of scanning the products displayed on the shelving in a predetermined order, it is possible to more accurately reproduce a display layout of the displayed products.

As a modification of the present example embodiment, the image processing unit 12 may perform the image recognition process by using contents specified by the attribute-for-area specifying unit 11. That is, in a case of performing the image recognition process on the image in the first area specified by the attribute-for-area specifying unit 11, the process may be performed by using only data corresponding to the attribute information specified corresponding to the first area among the pieces of the registration data (see FIG. 3). For example, in a case where "350 ml can" (attribute information) is specified corresponding to the first area, in the image recognition process for the image in the first area, the image recognition process may be performed by using only the appearance data of the object to be recognized associated with the attribute information of "350 ml can". Even in this way, it is possible to improve accuracy of the image recognition process.

Second Example Embodiment

The image processing apparatus 10 according to the present example embodiment is different from the first example embodiment in that the image processing apparatus 10 according to the present example embodiment has a function of recognizing a character string in the processed image and specifying the area and the attribute information on the basis of the recognized character string. Hereinafter, details will be described.

FIG. 2 illustrates an example of a functional block diagram of the image processing apparatus 10 according to the present example embodiment in the same manner as the first example embodiment. As illustrated, the image processing apparatus 10 includes the attribute-for-area specifying unit 11, the image processing unit 12, and the decision unit 13. The configuration of the image processing apparatus 10 except the attribute-for-area specifying unit 11 is the same as that of the first example embodiment.

The attribute-for-area specifying unit 11 specifies one or the plurality of areas in the processed image and specifies the attribute information in association with each of the areas. The attribute-for-area specifying unit 11 according to the present example embodiment has a unit of recognizing the character string in the processed image and a unit of specifying the area and the attribute information on the basis of the recognized character string.

For example, in the processed image (see FIG. 4) of the products displayed on the shelving, the attribute-for-area specifying unit 11 recognizes the character string of the price tag 103 installed in the price tag installation unit 101 on the shelving. The image processing apparatus 10 specifies the area on the basis of a position of the character string of the recognized price tag 103 and specifies the attribute information on the basis of contents of the recognized character string.

First, an example of a process of specifying the area on the basis of the position of the character string of the price tag 103 will be described. For example, the attribute-for-area specifying unit 11 identifies each of a plurality of tiers included in the shelving by recognizing the shelf board or the bottom board of the shelving in the image process. The attribute-for-area specifying unit 11 divides each of the plurality of tiers into the plurality of areas on the basis of a position of each of the character strings (for example, a character string of the price tag 103 installed in the product display unit 102 on a lower side of each tier, a character string of the price tag 103 installed in the product display unit 102 on an upper side of each tier, or the like) of a plurality of the price tags 103 recognized corresponding to each tier. For example, a predetermined position (for example, a center) between adjacent "character strings of the price tag 103" may be a boundary between two adjacent areas.

Next, an example of a process of specifying the attribute information on the basis of contents of the character string of the price tag 103 will be described. For example, the attribute-for-area specifying unit 11 may recognize a price written in the price tag 103. In addition, as illustrated in FIG. 8, the attribute-for-area specifying unit 11 may previously hold correspondence information for defining the attribute information for each of price ranges. Then, the attribute-for-area specifying unit 11 may specify the attribute information corresponding to each of the areas on the basis of the correspondence information and the recognized price.

In addition, the attribute-for-area specifying unit 11 may recognize the attribute information (for example, 350 ml can and 500 ml can) written in the price tag 103. Then, the attribute-for-area specifying unit 11 may specify the recognized attribute information in association with each of the areas.

Note that, instead of or in addition to the character string of the price tag 103 attached to the shelving, the attribute-for-area specifying unit 11 may recognize the character string (character string printed on packaging of the product) attached to the object to be recognized (product). Specifically, the attribute-for-area specifying unit 11 may recognize the attribute information such as 350 ml, 500 ml, or the like. In addition, the attribute-for-area specifying unit 11 may recognize the product name. The attribute-for-area specifying unit 11 may specify the area on which the objects to be recognized having the same product name and attribute information are imaged and may specify the attribute information in association with the area.

Next, an example of a flow of the process of the image processing apparatus 10 according to the present example embodiment will be described with reference to a flowchart in FIG. 7.

First, the image processing apparatus 10 obtains the processed image (S10).

After S10, the attribute-for-area specifying unit 11 specifies one or the plurality of areas in the processed image and specifies the attribute information in association with each of the areas (S11). In the present example embodiment, the attribute-for-area specifying unit 11 recognizes the character string in the processed image and specifies the area and the attribute information on the basis of the recognized character string.

In addition, after S10, the image processing unit 12 recognizes one or the plurality of objects to be recognized which are included in the processed image by the image recognition process using the registration data including the appearance image and/or the feature value of the appearance of each of the plurality of types of objects to be recognized (S12). Note that, orders of S11 and S12 are not limited to the orders illustrated in FIG. 7.

After then, the decision unit 13 decides the recognition result on the basis of the contents specified in S11 and the image recognition process in S12.

Next, an advantageous effect of the present example embodiment will be described. According to the image processing apparatus 10 according to the present example embodiment, the same advantageous effect as the first example embodiment can be realized.

In addition, the image processing apparatus 10 according to the present example embodiment can specify the area and the attribute information on the basis of the recognized character string in the processed image. Therefore, it is possible to reduce a burden of the user who specifies the area and the attribute information in the processed image.

Third Example Embodiment

The image processing apparatus 10 according to the present example embodiment is different from the first and second example embodiments in that the image processing apparatus according to the present example embodiment has a function of counting the number of times each of the objects to be recognized is extracted on the processed image and determining whether or not the counted number satisfies a predetermined condition. Hereinafter, details will be described.

Figure 9:
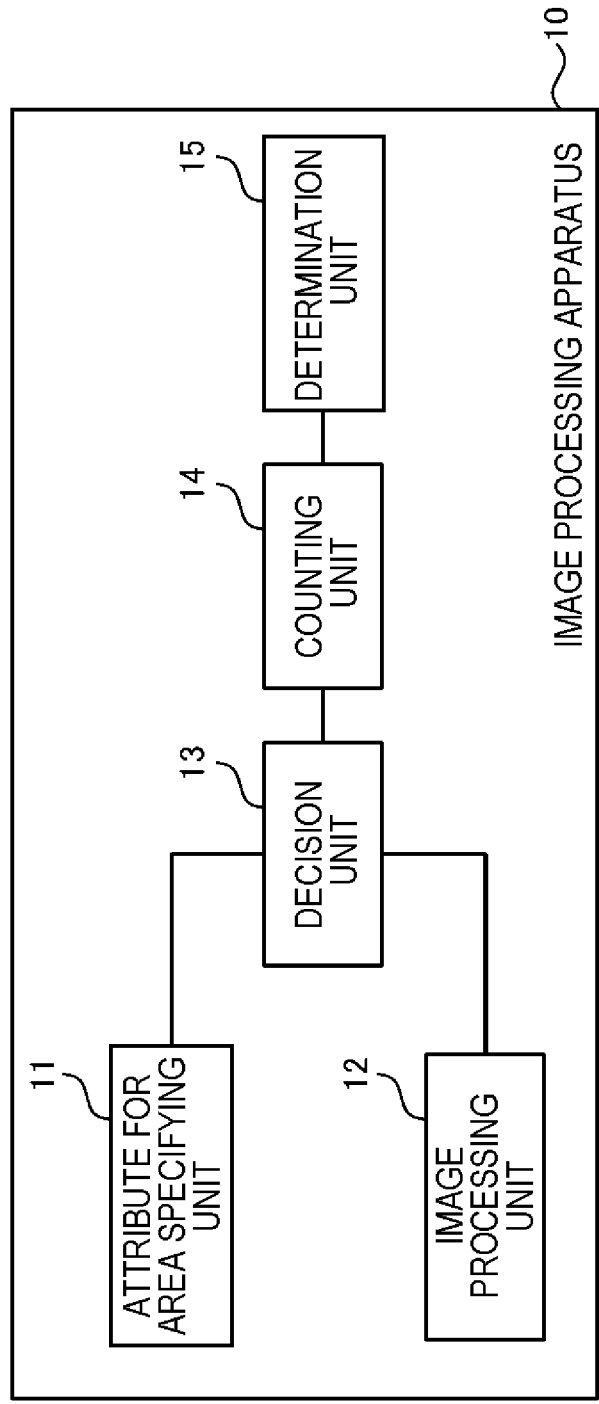
FIG. 9 is an example of another functional block diagram of the image processing apparatus according to the present example embodiment.

FIG. 9 illustrates an example of a functional block diagram of the image processing apparatus 10 according to the present example embodiment. As illustrated, the image processing apparatus 10 includes the attribute-for-area specifying unit 11, the image processing unit 12, the decision unit 13, a counting unit 14, and a determination unit 15. The configurations of the attribute-for-area specifying unit 11, the image processing unit 12, and the decision unit 13 are the same as that of the first and second example embodiments.

The counting unit 14 counts the number of times each of the objects to be recognized is extracted on the processed image on the basis of the recognition process decided by the decision unit 13. In a case where the object to be recognized is the product displayed on the shelving, the product displayed in the front row of the shelves is recognized. The counting unit 14 counts the number of the products, that is, the number of lines of each of the products.

The determination unit 15 determines whether or not the number of times being counted for each of the objects to be recognized satisfies the predetermined condition.

The image processing apparatus 10 can output a determination result ("satisfy" or "do not satisfy") for each of the objects to be recognized. The output is executed through various output devices such as a display, a projector, a mailer, a printer, and the like.

Next, an advantageous effect of the present example embodiment will be described. According to the image processing apparatus 10 according to the present example embodiment, the same advantageous effect as the first and second example embodiments can be realized.

In addition, the image processing apparatus 10 according to the present example embodiment can determine whether the number of times being extracted on the processed image satisfies the predetermined condition for each of the objects to be recognized and can output the result. In the case where the object to be recognized is the product displayed on the shelving, it is possible to count the number of the lines allocated on the shelving for each of the products and to determine whether the number of the lines satisfies the predetermined condition. For example, in a case where the number of lines for displaying each of the products is determined between a manufacturer and a retail store, it is possible to easily recognize whether or not the number of lines for displaying each of the products is in accordance with the determination by performing the process on the image obtained by capturing the shelving of the store using the image processing apparatus 10 according to the present example embodiment.

Example

Next, an example using the image processing apparatus 10 according to the present example embodiment will be described. In the example, the object to be recognized is the product displayed on the shelving of the store.

Figure 10:
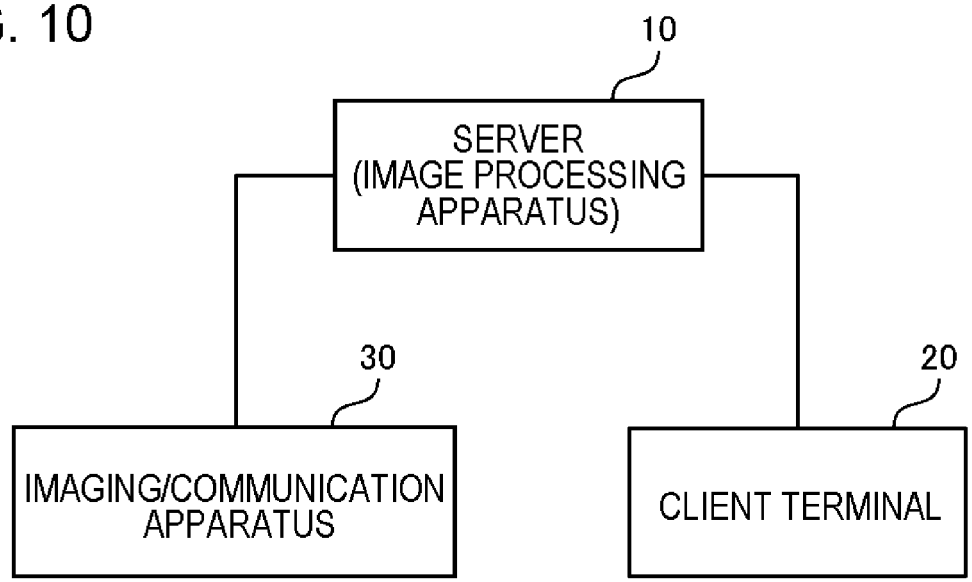
FIG. 10 is a functional block diagram illustrating a configuration example of an example of the present example embodiment.

FIG. 10 illustrates a configuration example in the example. As illustrated, a server (image processing apparatus 10), a client terminal 20, and an imaging/communication apparatus are included. The client terminal 20 is, for example, a personal computer (PC), a tablet terminal, a smartphone, a mobile phone, or the like. The imaging/communication apparatus 30 is, for example, a smartphone terminal, a mobile phone terminal, or the like. Note that, the imaging/communication apparatus 30 may be configured with a plurality of apparatuses physically or logically divided. For example, the imaging/communication apparatus 30 may be configured with an apparatus having an imaging function (for example, a camera) and an apparatus having a communication function (for example, a PC). Note that, the client terminal and the imaging/communication apparatus 30 may be the same apparatus or may be different apparatuses.

Next, a flow of a process and contents of the process for each of the apparatuses will be described. First, a worker goes to a predetermined store and uses the imaging/communication apparatus 30 to image the product displayed on the shelving. It is also possible to capture the entire of a portion of the shelving (for example, display space of beverages) of which a display situation is desired to be recognized, in one image file. In addition, the portion of the shelving may be divided to be captured into a plurality of image files.

After then, the worker uploads the captured image file to the image processing apparatus by using the imaging/communication apparatus 30. For example, the worker uploads the image file in association with the attribute information such as store identification information, imaging date and time, worker identification information, and the like.

Note that, in a case where the portion of the shelving of which the display situation is desired to be recognized is divided to be captured into the plurality of image files, the worker may combine the plurality of image files into one image file by using the imaging/communication apparatus 30 and then upload the image file. Alternately, the plurality of image files as it is may be uploaded in association with one another.

The image processing apparatus 10 stores the uploaded image file in association with the attribute information in a storage apparatus. Note that, in a case where the plurality of image files obtained by imaging the portion of the shelving of which the display situation is desired to be recognized is uploaded in association with one another, the image processing apparatus 10 combines the plurality of image files into one image file and then stores the image file.

The worker goes to one or a plurality of stores and performs the process described above.

After then, the worker operates the client terminal 20 to access to the image processing apparatus 10. Then, a predetermined image file stored in the storage apparatus is specified as the processed image and the image recognition process is executed. Then, the image processing unit 12 of the image processing apparatus 10 executes the image recognition process.

In addition, the worker causes a display of the client terminal 20 to display the processed image and specifies the area and the attribute information. The client terminal 20 transmits the specified area and attribute information to the image processing apparatus 10. The attribute-for-area specifying unit 11 of the image processing apparatus 10 obtains the specified area and attribute information and specifies the area and the attribute information on the basis of the input contents.

After then, the decision unit 13 of the image processing apparatus 10 decides the recognition result by using the contents specified by the attribute-for-area specifying unit 11 and the result of the image recognition process by the image processing unit 12.

Then, the recognition result decided by the decision unit 13 is transmitted to the client terminal 20. The client terminal 20 causes the display to display the recognition result. For example, as illustrated in FIG. 6, the screen on which the result is superimposed on the processed image is displayed.

The worker operates the client terminal 20 to perform an input of modifying the result, registering new registration data, or the like. The client terminal 20 transmits the input contents to the image processing apparatus 10. The image processing apparatus 10 modifies the result, registers new registration data, and the like on the basis of the received contents.

Thus, the recognition result decided by the decision unit 13 or a recognition result after the recognition result is modified by the worker is stored in a database on the server side in association with the processed image. Note that, the server (image processing apparatus 10) may output information in which the product code of the product recognized in the processed image and the number of products (the number of lines) for each of the products recognized in the image to be processed are arranged in order of the display thereof, by using the data. For example, the server may transmit the information to the client terminal 20 in response to a request from the client terminal 20. The client terminal 20 may output the information through the display or the like. The information may be output from the server as a CSV file, for example.

Hereinafter, appendixes to examples of reference forms will be added.

1. An image processing apparatus including:
an image processing unit that recognizes one or a plurality of objects to be recognized which are included in an image to be processed, by an image recognition process using registration data including an image and/or a feature value of each of a plurality of types of objects to be recognized;

an attribute-for-area specifying unit that specifies one or a plurality of areas in the image to be processed and specifies attribute information in association with the area; and a decision unit that decides a recognition result of the one or the plurality of objects to be recognized which are included in the image to be processed, on the basis of a result of the image recognition process by the image processing unit and the area and the attribute information specified by the attribute-for-area specifying unit.

2. The image processing apparatus according to appendix 1, in which the attribute-for-area specifying unit includes a unit that displays the image to be processed, and a unit that receives input information for specifying the area and the attribute information from a user on the displayed image to be processed and specifies the area and the attribute information on the basis of the input information.

3. The image processing apparatus according to appendix 1, in which the attribute-for-area specifying unit includes a unit that recognizes a character string in the image to be processed, and a unit that specifies the area and the attribute information on the basis of the recognized character string.

4. The image processing apparatus according to appendix 3, in which the object to be recognized is a product displayed on shelving, and the attribute-for-area specifying unit recognizes at least one of a character string of a price tag attached on the shelving or a character string attached on the product and specifies the area and the attribute information on the basis of the character string.

5. The image processing apparatus according to appendix 4, in which the attribute-for-area specifying unit specifies the area corresponding to each of a plurality of the price tags and specifies, for the area corresponding to each of the price tags, the attribute information corresponding to a price written in each of the price tags.

6. The image processing apparatus according to any one of appendixes 1 to 5, in which the object to be recognized includes a similar recognition object group of the objects to be recognized having identical or similar appearance designs and different sizes, and the attribute-for-area specifying unit specifies the attribute information for identifying the size for each of the areas.

7. The image processing apparatus according to appendix 6, in which in a case where the result of the image recognition process on a first object to be recognized located at a first area is inconsistent with the attribute information specified corresponding to the first area, the decision unit decides, from among the similar recognition object group to which the object to be recognized indicated in the result of the image recognition process belongs, the object to be recognized of which the attribute information coincides with the specified attribute information as the recognition result of the first object to be recognized.

8. The image processing apparatus according to appendix 6, in which in a case where the result of the image recognition process on a first object to be recognized located at a first area includes the plurality of objects to be recognized belonging to the same similar recognition object group, the decision unit decides the object to be recognized of which the attribute information coincides with the attribute information specified corresponding to the first area from among the plurality of objects to be recognized, as the recognition result of the first object to be recognized.

9. The image processing apparatus according to any one of appendixes 1 to 8, further including:

a counting unit that counts the number of times each of the objects to be recognized is extracted on the image to be processed, on the basis of the recognition result decided by the decision unit; and a determining unit that determines whether or not the number of times each of the objects to be recognized is counted satisfies a predetermined condition.

10. The image processing apparatus according to any one of appendixes 1 to 9, in which the object to be recognized is the product displayed on shelving, and the image processing unit determines a display position of each of the recognized objects to be recognized.

11. The image processing apparatus according to appendix 10, in which information, in which a product code of the product recognized in the image to be processed and the number of products for each of the products recognized in the image to be processed are arranged in order of display, is output.

12-1. An image processing method causing a computer to include:

an image processing step of recognizing one or a plurality of objects to be recognized which are included in an image to be processed, by an image recognition process using registration data including an image and/or a feature value of each of a plurality of types of objects to be recognized;

an attribute-for-area specifying step of specifying one or a plurality of areas in the image to be processed and specifying attribute information in association with the area; and a decision step of deciding the one or the plurality of objects to be recognized which are included in the image to be processed, on the basis of a result of the image recognition process by the image processing step and the area and the attribute information specified in the attribute-for-area specifying step.

12-2. The image processing method according to appendix 12-1, in which the attribute-for-area specifying step includes a step of displaying the image to be processed, and a step of receiving input information for specifying the area and the attribute information from a user on the image to be processed and specifying the area and the attribute information on the basis of the input information.

12-3. The image processing method according to appendix 12-1, in which the attribute-for-area specifying step includes a step of recognizing a character string in the image to be processed, and a step of specifying the area and the attribute information the basis of the recognized character string.

12-4. The image processing method according to appendix 12-3, in which the object to be recognized is a product displayed on shelving, and in the attribute-for-area specifying step, at least one of a character string of a price tag attached on the shelving or a character string attached on the product is recognized and the area and the attribute information are specified on the basis of the character string.

12-5. The image processing method according to appendix 12-4, in which in the attribute-for-area specifying step, the area corresponding to each of a plurality of the price tags is specified and the attribute information corresponding to a price written in each of the price tags is specified for the area corresponding to each of the price tags.

12-6. The image processing method according to any one of appendixes 12-1 to 12-5, in which the object to be recognized includes a similar recognition object group of the objects to be recognized having identical or similar appearance designs and different sizes, and in the attribute-for-area specifying step, the attribute information for identifying the size is specified for each of the areas.

12-7. The image processing method according to appendix 12-6, in which in the decision step, in a case where the result of the image recognition process on a first object to be recognized located at a first area is inconsistent with the attribute information specified corresponding to the first area, the object to be recognized of which the attribute information coincides with the specified attribute information is decided from among the similar recognition object group to which the object to be recognized indicated in the result of the image recognition process belongs, as the recognition result of the first object to be recognized.

12-8. The image processing method according to appendix 12-6, in which in the decision step, in a case where the result of the image recognition process on a first object to be recognized located at a first area includes the plurality of objects to be recognized belonging to the same similar recognition object group, the object to be recognized of which the attribute information coincides with the attribute information specified corresponding to the first area is decided from among the plurality of objects to be recognized, as the recognition result of the first object to be recognized.

12-9. The image processing method according to any one of appendixes 12-1 to 12-8, causing the computer to further execute:

a counting step of counting the number of times each of the objects to be recognized is extracted on the image to be processed, on the basis of the recognition result decided in the decision step; and a determination step of determining whether or not the number of times each of the objects to be recognized is counted satisfies a predetermined condition.

12-10. The image processing method according to any one of appendixes 12-1 to 12-9, in which the object to be recognized is the product displayed on shelving, and in the image processing step, a display position of each of the recognized objects to be recognized is determined.

12-11. The image processing method according to appendix 12-10, in which information, in which a product code of the product recognized in the image to be processed and the number of products for each of the products recognized in the image to be processed are arranged in order of display, is output.

13-1. A program causing a computer to function as:

an image processing unit that recognizes one or a plurality of objects to be recognized which are included in an image to be processed, by an image recognition process using registration data including an image and/or a feature value of each of a plurality of types of objects to be recognized;

an attribute-for-area specifying unit that specifies one or a plurality of areas in the image to be processed and specifies attribute information in association with the area; and a decision unit that decides the one or the plurality of objects to be recognized which are included in the image to be processed, on the basis of a result of the image recognition process by the image processing unit and the area and the attribute information specified by the attribute-for-area specifying unit.

13-2. The program according to appendix 13-1, in which the attribute-for-area specifying unit functions as a unit that displays the image to be processed, and a unit that receives input information for specifying the area and the attribute information from a user on the displayed image to be processed and specifies the area and the attribute information on the basis of the input information.

13-3. The program according to appendix 13-1, in which the attribute-for-area specifying unit functions as a unit that recognizes a character string in the image to be processed, and a unit that specifies the area and the attribute information on the basis of the recognized character string.

13-4. The program according to appendix 13-3, in which the object to be recognized is a product displayed on shelving, and the attribute-for-area specifying unit recognizes at least one of a character string of a price tag attached on the shelving or a character string attached on the product and specifies the area and the attribute information on the basis of the character string.

13-5. The program according to appendix 13-4, in which the attribute-for-area specifying unit specifies the area corresponding to each of a plurality of the price tags and specifies, for the area corresponding to each of the price tags, the attribute information corresponding to a price written in each of the price tags.

13-6. The program according to any one of appendixes 13-1 to 13-5, in which the object to be recognized includes a similar recognition object group of the objects to be recognized having identical or similar appearance designs and different sizes, and the attribute-for-area specifying unit specifies the attribute information for identifying the size for each of the areas.

13-7. The program according to appendix 13-6, in which in a case where the result of the image recognition process on a first object to be recognized located at a first area is inconsistent with the attribute information specified corresponding to the first area, the decision unit decides, from among the similar recognition object group to which the object to be recognized indicated in the result of the image recognition process belongs, the object to be recognized of which the attribute information coincides with the specified attribute information as the recognition result of the first object to be recognized.

13-8. The program according to appendix 13-6, in which in a case where the result of the image recognition process on a first object to be recognized located at a first area includes the plurality of objects to be recognized belonging to the same similar recognition object group, the decision unit decides the object to be recognized of which the attribute information coincides with the attribute information specified corresponding to the first area from among the plurality of objects to be recognized, as the recognition result of the first object to be recognized.

13-9. The program according to any one of appendixes 13-1 to 13-8, causing the computer to further function as:

a counting unit that counts the number of times each of the objects to be recognized is extracted on the image to be processed, on the basis of the recognition result decided by the decision unit; and a determining unit that determines whether or not the number of times each of the objects to be recognized is counted satisfies a predetermined condition.

13-10. The program according to any one of appendixes 13-1 to 13-9, in which the object to be recognized is the product displayed on shelving, and the image processing unit determines a display position of each of the recognized objects to be recognized.

13-11. The program according to appendix 13-10, in which information, in which a product code of the product recognized in the image to be processed and the number of products for each of the products recognized in the image to be processed are arranged in order of display, is output.

This application claims priority based on Japanese Patent Application No. 2016-143095 filed on Jul. 21, 2016, the disclosure of which is incorporated herein in its entirety.

The invention claimed is:

1. An image processing apparatus comprising:
   at least one memory configured to store one or more instructions; and
   at least one processor configured to execute the one or more instructions to:
   recognize a product included in an image;
   recognize a character string of a shelf tag in the image, the shelf tag attached on shelving displaying the product;
   specify an area corresponding to each of a plurality of the shelf tags in the image and attribute information based on the recognized character string; and
   determine, based on the recognized product, the specified area, and the specified attribute information, a product included in the image.

2. The image processing apparatus according to claim 1, wherein the processor is further configured to execute the one or more instructions to recognize the product by using registration data including at least one of images and feature values of a plurality of types of products.

3. The image processing apparatus according to claim 1, wherein the processor is further configured to execute the one or more instructions to:
   display the image on a display, and
   receive input information for specifying the area and the attribute information from a user on the displayed image.

4. The image processing apparatus according to claim 2, wherein the processor is further configured to execute the one or more instructions to:
   display the image on a display, and
   receive input information for specifying the area and the attribute information from a user on the displayed image.

5. The image processing apparatus according to claim 1, wherein the processor is further configured to execute the one or more instructions to determine whether or not the number of times each of the products is extracted on the image satisfies a predetermined condition based on the recognized product.

6. The image processing apparatus according to claim 2, wherein the processor is further configured to execute the one or more instructions to determine whether or not the number of times each of the products is extracted on the image satisfies a predetermined condition based on the recognized product.

7. The image processing apparatus according to claim 3, wherein the processor is further configured to execute the one or more instructions to determine whether or not the number of times each of the products is extracted on the image satisfies a predetermined condition based on the recognized product.

8. The image processing apparatus according to claim 4, wherein the processor is further configured to execute the one or more instructions to determine whether or not the number of times each of the products is extracted on the image satisfies a predetermined condition based on the recognized product.

9. The image processing apparatus according to claim 1, wherein the processor is further configured to execute the one or more instructions to determine a display position of each of the recognized products on a shelf.

10. The image processing apparatus according to claim 2, wherein the processor is further configured to execute the one or more instructions to determine a display position of each of the recognized products on a shelf.

11. The image processing apparatus according to claim 1, wherein the processor is further configured to execute the one or more instructions to output information, in which a product code of the product recognized in the image and the number of each of the recognized products are arranged in order of display.

12. An image processing apparatus comprising:
    at least one memory configured to store one or more instructions; and
    at least one processor configured to execute the one or more instructions to:
    recognize an object included in an image;
    specify an area in the image and attribute information in association with the area;
    specify the attribute information for identifying the size of the object to be recognized for each area; and
    determine, based on the recognized object, the specified area, and the specified attribute information, an object included in the image.

13. The image processing apparatus according to claim 12, wherein the processor is further configured to execute the one or more instructions to recognize the object to be recognized by using registration data including at least one of images of a recognition object group and feature values of the recognition object group, the recognition object group having identical or similar appearance designs and different sizes.

14. The image processing apparatus according to claim 12,
wherein the processor is further configured to execute the one or more instructions to:
display the image on a display, and
receive input information for specifying the area and the attribute information from a user on the displayed image.

15. The image processing apparatus according to claim 12,
wherein the processor is further configured to execute the one or more instructions to determine, from among a recognition object group to which the recognized object to be recognized belongs, the object of which the attribute information coincides with the specified attribute information of the first object to be recognized, in a case where the result of recognition on a first object to be recognized located at a first area is inconsistent with the attribute information specified corresponding to the first area.

16. The image processing apparatus according to claim 12,
wherein the processor is further configured to execute the one or more instructions to decide, from among the plurality of the recognized objects, the recognized object of which the attribute information coincides with the attribute information specified corresponding to a first area in a case where the recognized objects recognized on a first object located at the first area includes a plurality of the recognized objects belonging to the same similar recognition object group.

17. The image processing apparatus according to claim 12,
wherein the processor is further configured to execute the one or more instructions to:
count the number of times each of the recognized objects is extracted on the image, based on the recognition result decided; and
determine whether or not the number of times satisfies a predetermined condition.

18. The image processing apparatus according to claim 12,
wherein the recognized object is a product displayed on shelving, and
wherein the processor is further configured to execute the one or more instructions to determine a display position of each of the recognized objects to be recognized.

19. The image processing apparatus according to claim 12,
wherein the processor is further configured to execute the one or more instructions to output information, in which a product code of the recognized product and the number of each of the recognized products are arranged in order of display.

20. An image processing method executed by a computer, the method comprising:
recognizing a product included in an image;
recognizing a character string of a shelf tag in the image, the shelf tag attached on shelving displaying the product;
specifying an area corresponding to each of a plurality of the shelf tags in the image and attribute information based on the recognized character string; and
determining, based on the recognized product, the specified area, and the specified attribute information, a product included in the image.

21. The image processing apparatus according to claim 1, wherein the area corresponding to each of the plurality of shelf tags is specified based on a position of each of the plurality of shelf tags in the image.

* * * * *